United States Patent
Zhao (10) Patent No.: US 11,621,950 B2
(45) Date of Patent: Apr. 4, 2023

(54) DATA PROCESSING METHODS, SERVERS, CLIENT DEVICES AND MEDIA FOR SECURITY AUTHENTICATION

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 59 days.

(21) Appl. No.: 17/270,533

(22) PCT Filed: Aug. 20, 2019

(86) PCT No.: PCT/CN2019/101645
§ 371 (c)(1),
(2) Date: Feb. 23, 2021

(87) PCT Pub. No.: WO2020/042973
PCT Pub. Date: Mar. 5, 2020

(65) Prior Publication Data
US 2021/0194869 A1    Jun. 24, 2021

(30) Foreign Application Priority Data

Aug. 27, 2018 (CN) .......................... 201810984347.2

(51) Int. Cl.
*H04L 9/40* (2022.01)
*G06F 21/33* (2013.01)
*H04L 9/06* (2006.01)

(52) U.S. Cl.
CPC .......... *H04L 63/0823* (2013.01); *G06F 21/33* (2013.01); *H04L 9/0643* (2013.01)

(58) Field of Classification Search
CPC ............... H04L 63/0823; H04L 9/0643; H04L 63/0807; H04L 9/0869; H04L 9/0891;
(Continued)

(56) References Cited

U.S. PATENT DOCUMENTS

| 10,313,858 B2 | 6/2019 | Brown et al. |
| 2010/0106771 A1 | 4/2010 | Park et al. |

(Continued)

FOREIGN PATENT DOCUMENTS

| CN | 102932336 A | 2/2013 |
| CN | 103236927 A | 8/2013 |

(Continued)

OTHER PUBLICATIONS

Extended European Search Report in corresponding European Application No. 19854559.2, dated Apr. 26, 2022, 6 pages.
Office Action for corresponding Chinese application No. 201810984347.2 and English translation, dated Dec. 3, 2021. 22 pages.

(Continued)

*Primary Examiner* — Jacob Lipman
(74) *Attorney, Agent, or Firm* — Leason Ellis LLP (57) ABSTRACT

Provided are a data processing method, a server, a client device and medium for security authentication. The data processing method includes: receiving the identifier of the application entity; generating, at least based on the identifier, a dynamic security identifier for the application entity; sending the security identifier to the application entity, and performing a security authentication operation for the application entity based on the security identifier.

15 Claims, 5 Drawing Sheets

(58) Field of Classification Search
CPC ....... H04L 9/3228; H04L 69/04; H04L 63/08; H04L 67/02; G06F 21/33
USPC .......................................................... 713/156
See application file for complete search history.

(56) References Cited

U.S. PATENT DOCUMENTS

| | | | | |
|---|---|---|---|---|
| 2014/0207932 | A1* | 7/2014 | Hyo | ............... H04L 63/08 709/223 |
| 2015/0128285 | A1* | 5/2015 | LaFever | ............. H04L 63/0414 726/26 |
| 2016/0345176 | A1* | 11/2016 | DeWitt | ................ H04W 64/00 |
| 2016/0381011 | A1* | 12/2016 | Mu | ...................... H04L 63/083 713/169 |
| 2017/0338951 | A1* | 11/2017 | Fu | ......................... H04L 9/0852 |
| 2018/0129801 | A1 | 5/2018 | Cambou | |
| 2018/0324170 | A1 | 11/2018 | Chen et al. | |

FOREIGN PATENT DOCUMENTS

| | | |
|---|---|---|
| CN | 104579694 A | 4/2015 |
| CN | 104980920 A | 10/2015 |
| CN | 105743638 A | 7/2016 |
| CN | 106331772 A | 1/2017 |
| CN | 106797391 A | 5/2017 |
| CN | 106960148 A | 7/2017 |
| CN | 104618120 B | 1/2018 |
| CN | 108173662 A | 6/2018 |
| EP | 3195566 B1 | 7/2017 |
| WO | 2017121270 A1 | 7/2017 |
| WO | 2018011078 A1 | 1/2018 |

OTHER PUBLICATIONS

Office Action and English Translation for corresponding Indian Application No. 202117012361, dated Nov. 18, 2022.

* cited by examiner

DATA PROCESSING METHODS, SERVERS, CLIENT DEVICES AND MEDIA FOR SECURITY AUTHENTICATION

CROSS-REFERENCE TO RELATED APPLICATION

This application is a U.S. National Stage Application under 35 U.S.C. § 371 of International Patent Application No. PCT/CN2019/101645, filed Aug. 20, 2019, which claims the benefit of priority of Chinese patent application No. 201810984347.2 filed on Aug. 27, 2018, both of which are incorporated by reference in their entireties. The International Application was published on Mar. 5, 2020, as International Publication No. WO 2020/042973 A1.

TECHNICAL FIELD

The present disclosure relates to the field of the Internet of Things (IoT) and specifically to a data processing method, server, client device and medium for security authentication within an Internet of Things system.

BACKGROUND

In an IoT system, data and requests need to be transmitted between a client and a server. If an unregistered client disguises itself as a registered client and sends a large number of requests or data to the server, the service may be caused to crash. Therefore, there is a need to provide a security authentication mechanism that can effectively determine whether the device sending a large number of requests or data is a unique registered device on the network, preventing data leakage and data transmission blockage.

SUMMARY

In order to solve the above problem, there are provided a data processing method, a server, a client device and medium for security authentication in the present disclosure.

According to an aspect of the present disclosure, there is provided a data processing method for security authentication, comprising: receiving an identifier from an application entity; generating, at least based on the identifier, a dynamic security identifier for the application entity; sending the security identifier to the application entity; performing a security authentication operation on the application entity according to the security identifier.

According to some embodiments of the present disclosure, said generating, at least based on the identifier, the dynamic security identifier for the application entity comprises: generating the security identifier based on the identifier and a random identifier.

According to some embodiments of the present disclosure, said generating the security identifier based on the identifier and the random identifier comprises: generating a string by combining the identifier and the random identifier; transforming the string to a hash value using a hash algorithm, and taking the hash value as the security identifier.

According to some embodiments of the present disclosure, the method further comprises: storing the security identifier in association with the identifier, the method further comprises: performing an update operation on the security identifier according to a predetermined rule; and replacing the stored security identifier in association with the identifier with the updated security identifier.

According to some embodiments of the present disclosure, the random identifier comprises a Universally Unique Identifier (UUID).

According to some embodiments of the present disclosure, said performing the security authentication operation on the application entity according to the security identifier comprises: comparing a security identifier received from the application entity with the stored security identifier in association with the identifier, and if a comparison result indicates that the received security identifier is consistent with the security identifier in association with the received identifier, the authentication passes, otherwise the authentication does not pass.

According to some embodiments of the present disclosure, the predetermined rule comprises that a time from a previous update exceeds a predetermined time threshold.

According to some embodiments of the present disclosure, the predetermined rule comprises that the security identifier has been used for security authentication for a number of times more than a predetermined threshold value.

According to another aspect of the present disclosure, there is provided a data processing method for security authentication, comprising: sending a connection request to a common service entity, the connection request comprising an identifier of an application entity; receiving a dynamically generated security identifier for the application entity from the common service entity; replacing a stored security identifier in association with the identifier with the received security identifier from the common service entity.

According to another aspect of the present disclosure, there is provided a server, comprising: a processor, configured to: receive a connection request sent by an application entity, the connection request comprising an identifier corresponding to the application entity; generate, at least based on the identifier, a dynamic security identifier for the application entity; perform a security authentication operation on the application entity according to the identifier and a security identifier; and send the generated security identifier to the application entity; and a database, configured to store the identifier and the security identifier in association with the identifier.

According to another aspect of the present disclosure, there is provided a client server, comprising: an output device, configured to send a connection request to a common service entity, the connection request comprising an identifier of an application entity; an input device, configured to receive a dynamically generated security identifier for the application entity from the common service entity; a storage device, configured to store the security identifier for the application entity and the identifier; and a processor, configured to replace the stored security identifier for the application entity with the security identifier received from the common service entity.

Using the embodiments provided in this disclosure, the security of the application entity's access to the server can be enhanced, and the following problem can be solved: an application entity registered with the common service entity is intercepted or monitored by other devices during data transmission, for example, over the HTTP protocol, and the other devices are disguised as the registered application entity to access and acquire the registered resources of the common service entity, so data leakage and data congestion may be caused.

BRIEF DESCRIPTION OF THE DRAWINGS

In order to illustrate more clearly the technical scheme of the embodiments of the present disclosure, a brief description of the drawings required to be used in the description of the embodiments will be given below, and it is obvious that the drawings in the description below are only some of the embodiments of the present disclosure, and that other drawings may be obtained from them without paying inventive efforts by those skilled in the art. The following drawings have not been intentionally scaled to actual dimensions, but rather to illustrate the concept of this disclosure.

DETAILED DESCRIPTION

In order to make the purpose, technical solutions and advantages of the present disclosure more clear, the following embodiments are given to further elaborate on this disclosure. Obviously, the embodiments described are only part of the embodiment of the present disclosure and not the entire embodiment. Based on the embodiments in the present disclosure, all other embodiments obtained without inventive efforts by those skilled in the art fall within the scope of this disclosure.

Figure 1:
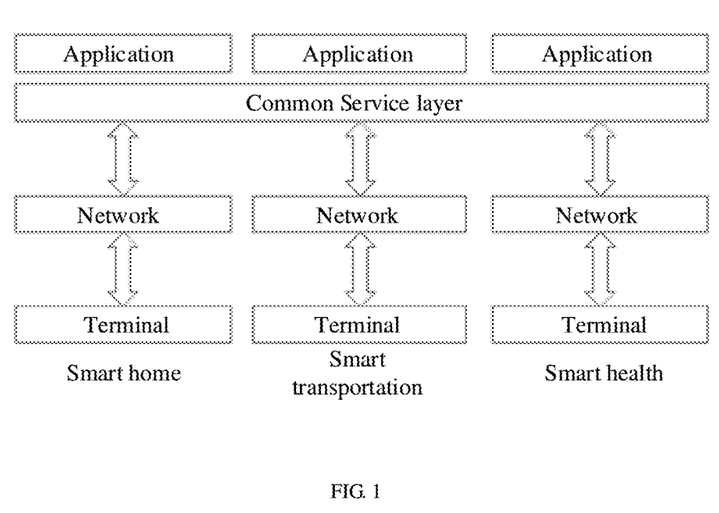
FIG. 1 discloses a schematic architecture of the Internet of Things according to the present disclosure.

With the development of information technology, especially Internet technology, the IoT technology for informationization, remote management control and intelligentization network has gradually matured. The IoT uses local network or Internet and other communication technologies to connect sensors, controllers, machines, people, and objects in a new way to form a connection among people and things, and a connection among things and things. The IoT is an extension of the Internet. It includes the Internet and all resources on the Internet and is compatible with all Internet applications. With the application of the IoT technology in various fields, various new application fields such as intelligent home, intelligent transportation, and intelligent health have emerged. As shown in FIG. 1, the client devices of various terminals access the network, and access to a common service layer supporting various applications through the network, thus an architecture of terminal plus network plus application is formed. For example, in the smart home field, various household devices can use the local area network (LAN) to access a common service platform in a wireless or wired way. Optionally, the said LAN can be a local area network (PAN), for example, in the case of wireless personal area network (WPAN), Bluetooth, IrDA, Home RF, ZigBee, or UWB (Ultra-Wideband Radio) and other technologies can be used to achieve access.

As described earlier, when an IoT entity, for example, an IoT terminal device or a software module in a node device, transmits data or information to a common service entity, the data or information can be stored as a separate resource. In addition, the IoT entity may send a request to the common service entity to update the resources corresponding to the IoT entity stored on the common service entity to reflect the status of the devices on which the IoT entity is resident. The update can be real-time or periodic, or can be triggered by a certain condition. Thus, other IoT entities communicating with the common service entity may learn the status of the device corresponding to the IoT entity by accessing the updated resource. Alternatively, other IoT entities communicating with the common service entity may operate on the updated resource. It should be noted that the resources mentioned here include resources of various entities (e.g., entities that can be embodied as software modules in IoT devices, such as AEs, CSEs, etc.). An entity can represent the software module of a communication device, while the common service entity can represent the software module of the service platform, which can be local or remote. Optionally, operating on the updated resource includes, for example, obtaining information about the updated resource, deleting information about the updated resource, notifying a third party about the updated resource, or performing operations on other resources based on information about the updated resource.

In the present disclosure, the entities described, such as the application entity AE, the common service entity CSE, and the data, may be represented by resources. A resource can have a unique identity, which includes attributes and sub-resources, where attributes are used to store information about the resource, sub-resources are a lower level of the resource, and the resource includes an index directing to the sub-resources.

Figure 2:
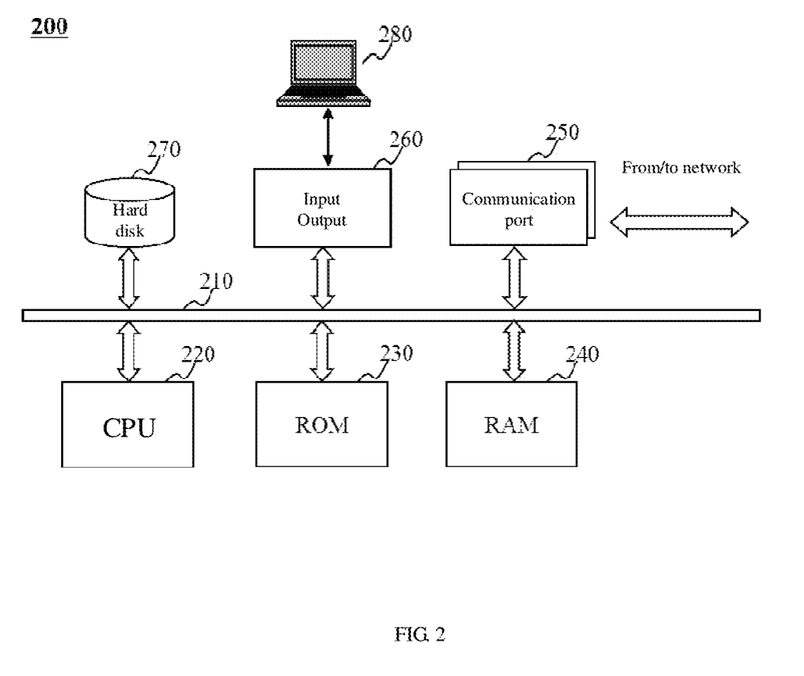
FIG. 2 illustrates a schematic diagram of a server/client device according to some embodiments of the present disclosure.

FIG. 2 illustrates a schematic diagram of a server/client device according to some embodiments of the present disclosure. In the IoT system, the above service platform can be implemented using servers and the above terminal devices can be implemented using client devices.

FIG. 2 is an architecture of a computer device according to some embodiments of the present disclosure. Such computer device may be used to implement a server device or client devices as disclosed in this disclosure. Such computers can include personal computers, laptops, tablets, mobile phones, personal digital assistants (PDAs), smart glasses, smart watches, smart rings, smart helmets and any smart portable or wearable device. In some embodiments, various smart home terminal devices in the IoT system, such as smart switches, smart gateways, smart rice cookers, smart purifiers, etc., can also be implemented using the architecture of the computer device illustrated in FIG. 2. The particular system in this implementation utilizes a functional block diagram to explain a hardware platform that includes a user interface. Such a computer device may be a general computer device, or a computer device with a specific purpose. Both kinds of computer devices may be used to implement the server device or the terminal client devices in the present disclosure. A computer system 200 may implement any of the components to provide information required for IoT communication described here. For example, the computer system 200 can be implemented by the computer device through its hardware devices, software programs, firmware, and combinations thereof. For convenience, only one computer device is illustrated in FIG. 2, but the relevant computer functions described in this embodiment for providing the information required for IoT communication can be implemented in a distributed manner by a set of similar platforms to distribute the processing load of the system.

The computer system 200 may include a communication port 250, and a network for implementing data communication is connected to the communication port 250. The computer system 200 may also include a processor 220 for executing program instructions. The processor 220 may include one or more processors. The computer 200 may include an internal communication bus 210. The computer 200 may include different forms of program storage units as well as data storage units, such as a hard disk 270, a read-only memory (ROM) 230, a random access memory (RAM) 240, capable of storing various data files used by the computer for processing and/or communication, and possible program instructions executed by the processor 220. The computer system 200 may also include an input/output component 260 that supports input/output data flow between the computer system 200 and other components, such as the user interface 280. The computer system 200 may also send and receive information and data via communication port 250.

In some embodiments, the above-mentioned computer system 200 may be used to form the server in an IoT communication system. The server of the IoT communication system can be a server hardware device, or a group of servers. Individual servers within the group of servers can be connected via a wired or wireless network. The group of servers can be centralized, such as a data center. The group of servers can also be distributed, such as a distributed system.

The above outlines different aspects of the approach for providing the information required for secure authentication of IoT communications and/or the approach to achieving other steps through the program. The program part of a technology may be considered a "product" or "manufacture" in the form of executable code and/or associated data, engaged in or realized through a computer-readable medium. A tangible, permanent storage medium may include memory or storage used in any computer, processor, or similar device or associated module, such as various semiconductor memories, tape drives, disk drives, or any similar device that can provide storage capabilities for software.

Figure 3:
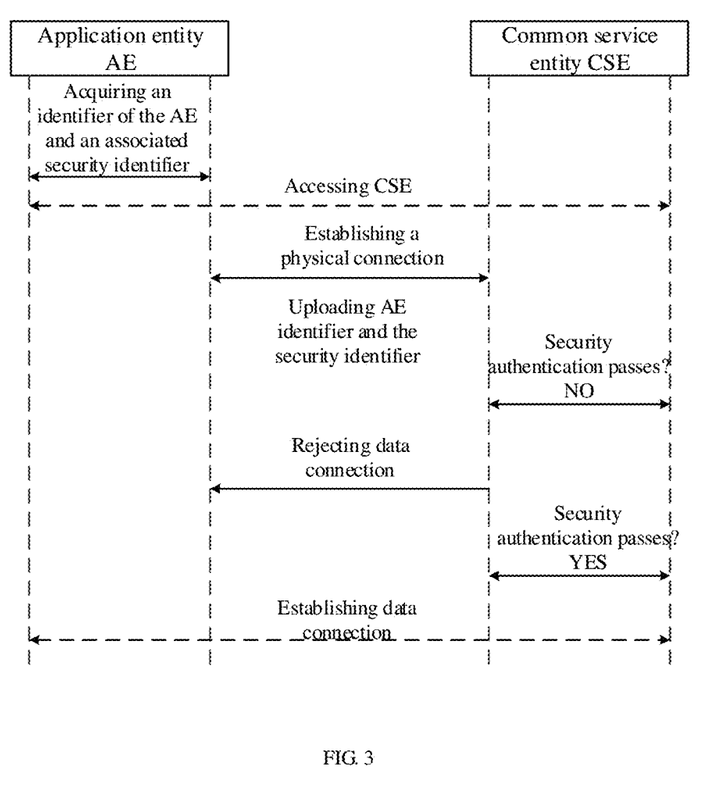
FIG. 3 illustrates a schematic flow chart of a method for security authentication according to the present disclosure.

FIG. 3 illustrates a flow chart of a data processing method for security authentication according to the present disclosure.

In the method for security authentication of the IoT system, an identifier of the application entity can be used to perform security authentication of the application entity. For example, secure authentication of the application entity can be implemented using the identifier of the application entity and a digital certification in association with the application entity.

Generally, the identifier AE-ID of the application entity is unique and fixed. Insecurity occurs if a pre-defined application entity identifier AE-ID is always used as a connection standard for secure authentication. For example, if a third-party device obtains the identifier AE-ID of the application entity through certain means and uses the identifier to disguise itself as the application entity to establish a connection with the common service entity, it can lead to repeated instances of application entity fraud.

Thus, in other embodiments, security authentication of the application entity may be achieved by using the identifier AE-ID of the application entity to generate a dynamic security identifier for security authentication.

As shown in FIG. 3, the application entity AE may obtain the identifier of the application entity and a security identifier in association with the identifier. The identifier of the application entity mentioned here may refer to a firmware identifier of the software of the application entity, or it may refer to a unique identification number of the hardware of the application entity.

When the application entity AE sends an access request to the common service entity CSE, for example, to create a resource, the application entity establishes a physical connection to the common service entity CSE by accessing a service address of the common service entity CSE. The request sent by the application entity AE to the common service entity CSE may include the identifier of the application entity AE. In some embodiments, the request may also include the security identifier of the application entity. If it is the first time for the application entity AE to send a connection request to the common service entity, the security identifier sent by the application entity AE to the common service entity CSE can be a default security identifier or no security identifier is included in the request. The default security identifier can be preset by the user. If it is not the first time for the application entity AE to send a connection request to the common service entity, the security identifier may be the security identifier used by the current security authentication mechanism, i.e., the security identifier generated for the application entity described using the methods provided in the present disclosure.

After the common service entity CSE receives the identifier and the security identifier of the application entity AE sent by the application entity, the common service entity CSE determines whether the identifier of the application entity AE has been stored in the common service entity.

If the identifier of the application entity AE and the security identifier in association with the application entity AE are not stored in the common service entity CSE, the common service entity CSE may generate a random identifier and use the generated random identifier and the identifier of the application entity AE to form a new string.

In some embodiments, the random identifier can be a random number. The common service entity CSE can dynamically change the security identifier of the application entity AE by continuously generating new random number based on a predefined rule and combining the new random number with the identifier of the application entity AE into a new string.

In some embodiments, the random identifier may be a Universal Unique Identifier (UUID), which is a standard for software constructs and is used by an organization of the Open Software Foundation (OSF) as part of the Distributed Computing Environment (DCE) field. Once generated, the UUID will be a unique identifier. Commonly used UUIDs can be, for example, a global unique identifier GUID.

In some embodiments, a string combining the generated random identifier with the identifier of the application entity AE may be used as the security identifier of the application entity AE.

In some embodiments, the string generated by combining the random identifier with the identifier of the application entity AE is mapped into a string with a smaller length. For example, in the case of using the UUID as the random identifier, both storing and transmitting the UUID would require more system resources due to the larger space occupied by the UUID. Thus, the string generated by combining the random identifier with the identifier of the application entity AE is mapped into the string with the smaller length, thus making storage and transmission of the security identifier easier.

In some embodiments, a Hash method may be called to process the string including the random identifier and the identifier of the application entity AE by transforming said string into a hash value that serves as the security identifier. The above hash value can be generated using commonly used hash algorithms such as MD4, MD5, SHA, etc.

By transforming the security identifier to the hash value, the security identifier can be compressed and fixed to a preset length, and system resources occupied by the security identifier can be reduced.

After the hash value is generated as the security identifier, the common service entity CSE stores the security identifier in association with the identifier of the application entity AE in a database for the common service entity CSE. For example, the identifier of the application entity AE and its associated security identifier can be saved as a key-value pair. At the same time, the common service entity CSE can send the security identifier to the corresponding application entity AE, allowing the application entity AE to store the security identifier in association with the identifier of the application entity AE. For example, the security identifier can be saved with the identifier of the application entity AE in the form of key-value pair.

In some embodiments, the application entity AE may send an acknowledgement of the security identifier to the common service entity CSE, and upon receipt of the acknowledgement, the common service entity CSE acts in response to a request from the application entity AE, for example, to create a resource in response to a request to create a resource sent by the application entity AE.

In some embodiments, if the common service entity CSE determines that the security identifier in association with the identifier of the application entity AE has been previously stored, the common service entity CSE will determine whether the security identifier currently sent by the application entity matches the security identifier stored in the common service entity SCE. If the security identifier sent by the application entity AE does not match the security identifier stored in the common service entity CSE, or if the application entity AE sends only the identifier of the application entity AE while not simultaneously sending the security identifier in association with the identifier of the application entity AE, the common service entity CSE will deny data connections to the application entity AE.

If the security identifier currently sent by the application entity AE matches the security identifier stored in the common service entity CSE, the common service entity CSE will consider the application entity AE as having passed the security authentication. The data connection between the application entity AE and the common service entity CSE will be established and data will be transmitted.

In some embodiments, the common service entity CSE will update the security identifier used for the application entity AE according to the predefined rules. For example, the common service entity CSE may update the random identifier applied to the application entity AE at regular interval. For example, it is possible to perform random identifier updates based on user's preset time interval (e.g., 5 minutes, 10 minutes, etc.). The above time intervals are merely illustrative embodiments and do not constitute a limitation of this disclosure. Those skilled in the art can set the time interval for updating according to actual situations. Therefore, when the common service entity CSE determines that the current security identifier has been in use for longer than the user's preset time interval, the security identifier update can be performed.

For another example, the common service entity CSE may determine whether the security identifier has been used for security authentication for a number of times more than a predetermined threshold value and updating of the random identifier is performed based on the determination. For example, if the security identifier currently used has been used for security authentication for a predetermined number of times (e.g., 5 times, 10 times, etc.), the security identifier can be updated.

In some embodiments, the update operation may include a common service entity CSE generating a new random identifier and generating a new security identifier based on the identifier of the application entity AE and the new random identifier. After the security identifier is updated, the common service entity CSE can send the updated security identifier to the corresponding application entity AE, which allows the application entity AE to update the security identifier stored in the application entity AE.

Dynamic security authentication of AE device can be achieved using the data processing method for security authentication provided in the present disclosure. Based on the original application entity identifier AE-ID and randomly varied random identifiers, the security authentication mechanism provided herein can also enhance the security of the application entity access even if any one of the application entity AE's identifier AE-ID and/or the security identifier is stolen, since the security identifier is constantly varied during the period of communication between the application entity AE and the common service entity CSE, and in turn new security identifiers will be generated continuously during this period of communication. The security authentication mechanism provided herein can solve the following problem: an application entity registered with the common service entity is intercepted or monitored by other devices during data transmission, for example, over the HTTP protocol, and the other devices are disguised as the registered application entity to access and acquire the registered resources of the common service entity, so data leakage and data congestion may be caused.

In addition, UUID may be used as an example of the random identifier in the present disclosure, and a hash function (hash) may be used to transform a string including the identifier of the application entity AE and the random identifier (e.g., UUID) into a hash value with a fixed length to achieve a compression mapping. This saves storage space for the security identifier.

Figure 4:
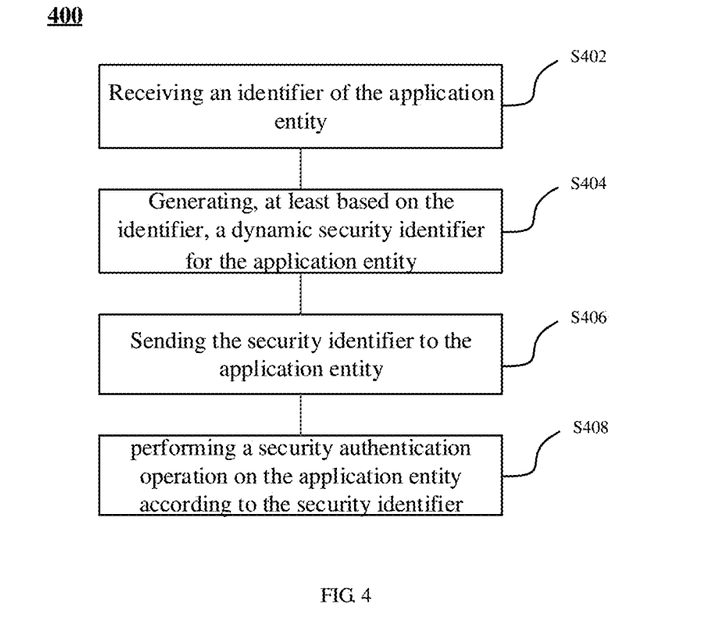
FIG. 4 illustrates an exemplary flow chart of a method for security authentication according to some embodiments of the present disclosure.

FIG. 4 illustrates an exemplary flow chart of a data processing method for security authentication according to some embodiments of the present disclosure. The data processing method as shown in FIG. 4 can be performed by the server device as shown in FIG. 2. As shown in FIG. 4, the data processing method may include step S402: receiving the identifier of the application entity; step S404: generating, at least based on the identifier, a dynamic security identifier for the application entity, that is, a security identifier is generated dynamically for the application entity at least based on the identifier; step S406: sending the security identifier to the application entity, and step S408: performing a security authentication operation for the application entity based on the security identifier.

In some embodiments, step S404 may include: generating the security identifier based on the identifier and the random identifier.

In step S404, generating the security identifier can include: combining the identifier and the random identifier to generate a string; transforming the string to the hash value using a hashing algorithm, and taking the hash value as the security identifier. Therein, the identifier of the application entity and the random identifier can be combined in any way. For example, the identifier of the application entity and the random identifier may be combined in such a way that the identifier of the application entity is set before and the random identifier is set after. For another example, the identifier of the application entity and the random identifier may be combined in such a way that the random identifier is set before and the identifier of the application entity is set after. For another example, it is possible to rearrange the order of characters in the identifier of the application entity and the random identifier in a predetermined manner and to form a new combined string. In some embodiments, the random identifier may be a Universally Unique Identifier (UUID).

In some embodiments, step S404 may further include storing the dynamically generated security identifier in association with the identifier of the application entity in a database, and sending the dynamically generated security identifier to the application entity in association with the security identifier.

In step S406, the security identifier may be sent to the application entity for storage.

In step S408, security identifiers received from the application entity may be compared with the security identifier in association with the identifier stored in the database, and if a result of the comparison indicates that the received security identifier is consistent with the security identifier stored in the database in association with the received identifier, the authentication passes, otherwise authentication does not pass.

The data processing method 400 as shown in FIG. 4 may further include the following steps for implementing the update operation: updating the security identifier for the application entity based on the predetermined rule; and replacing the security identifier stored in the database in association with the identifier with the updated security identifier. The predetermined rule may include whether the time from a previous update exceeds a predetermined time threshold. For example, the update operation can be performed after a user's preset time interval. Alternatively, the predetermined rule may include whether the security identifier has been used to perform security authentication for a number of times more than a predetermined threshold. For example, the update operation can be performed when the currently used security identifier has undergone the security authentication operations for more than a preset number of times.

Using the data processing method for security authentication provided by the present disclosure, the security identifier used for the application entity may be updated at regular interval to a new security identifier in accordance with the predetermined rule. Thus, even if the security identifier is stolen, after a period of time, the previously generated security identifier cannot pass the security authentication.

Figure 5:
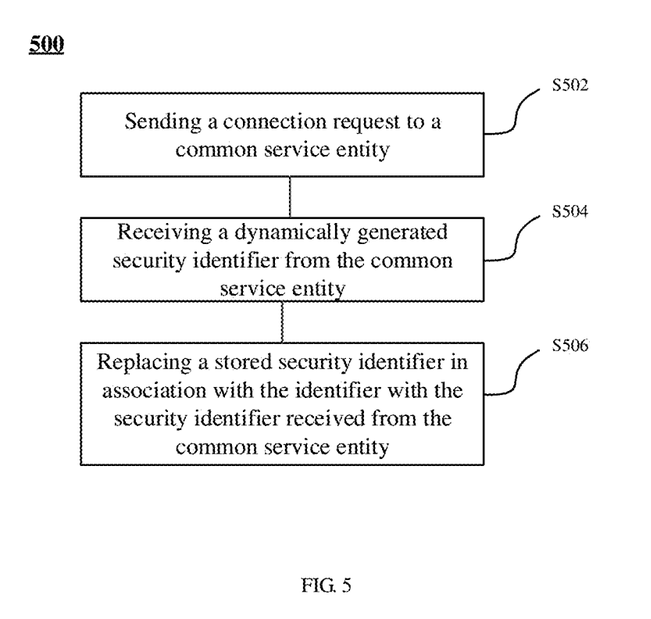
FIG. 5 illustrates a method for security authentication according to some embodiments of the present disclosure.

FIG. 5 illustrates a method for security certification according to some embodiments of the present disclosure. The method for security authentication shown in FIG. 5 can be implemented by the client device.

As shown in FIG. 5, the data processing method may include step S502: sending a connection request to the common service entity, the connection request including an identifier of an application entity; step S504: receiving a dynamically generated security identifier a the common service entity; step S506: replacing a stored security identifier in association with the identifier with the security identifier received from the common service entity.

That is, the client device enables dynamic security authentication between the application entity on the client device and the common service entity by receiving the security identifier in association with the application entity on the client device and sent from the common service entity.

In some embodiments, the request sent by the application entity to the common service entity may include the security identifier in association with the identifier of the application entity.

In some embodiments, the security identifier is generated based on the identifier of the application entity and the random identifier. Therein the random identifier may be the Universally Unique Identifier (UUID).

For the client device, after the common service entity CSE performs the update operation on the security identifier, the client device accepts and stores the updated security identifier and sends the updated security identifier to the common application entity CSE for security authentication operation when sending a next connection request to the common service entity.

Using the data processing methods for secure authentication provided by the present disclosure, a technical effect of enhancing the security of the application entity's access can be achieved, and can solve the following problem: an application entity registered with the common service entity is intercepted or monitored by other devices during data transmission, for example, over the HTTP protocol, and the other devices are disguised as the registered application entity to access and acquire the registered resources of the common service entity, so data leakage and data congestion may be caused.

According to another aspect of the present disclosure, there is also provided a computer-readable storage medium having computer program instructions stored thereon, said computer program instructions implementing data processing methods as previously described when executed by a processor.

According to another aspect of this disclosure, a server device is also provided. The server device may include a processor configured to enable the server device to perform the data processing method as described in FIG. 4 when computer program instructions are read using the processor. The server device may further comprise the storage unit that serves as a database, the database being configured to store the identifier and the security identifier in association with the identifier.

According to another aspect of this disclosure, a client device is also provided. The client device may include an output device configured to send a connection request to a common service entity, the connection request including the identifier corresponding to an application entity; an input device configured to receive a dynamic security identifier generated from the common service entity; a storage device configured to store the security identifier and the identifier for the application entity; and a processor configured to replace the stored security identifier for the application entity with the security identifier received from the common service entity.

A computer-readable medium may take many forms, including tangible storage media, carrier wave media, physical transmission media and the like. Stable storage media may include: optical disks or magnetic disks, and other storage systems used in computers or similar devices that can implement the system components described in the figures. Unstable storage media may include dynamic memories, such as a main memory of a computer platform. Tangible transmission media may include coaxial cables, copper cables, and optical fibers, such as lines that form a bus inside a computer system. Carrier wave transmission media may transmit electrical signals, electromagnetic signals, acoustic signals, light signals and the like. These signals may be generated by methods of radio frequency or infrared data communication. Common computer-readable media include hard disks, floppy disks, magnetic tapes and any other magnetic media; CD-ROMs, DVDs, DVD-ROMs and any other optical media; punch cards and any other physical storage media containing an aperture pattern; RAMs, PROMs, EPROMs, FLASH-EPROMs and any other memory chips or magnetic tapes; carrier waves for transmitting data or instructions, cables or connection devices for transmitting carrier waves and any other program codes and/or data that can be read by computers. Many of these forms of computer-readable media will appear in processes of a processor executing instructions and transferring one or more results, to perform the communication methods applied to the central control device and the application device.

As used in this application, "module" means a logic or set of software instructions stored in hardware, firmware. The "modules" referred to herein are capable of being executed via software and/or hardware modules, or stored in any kind of computer-readable non-transitory medium or other storage device. In some embodiments, a software module may be compiled and attached to an executable program. Obviously, the software module here can respond to information passed by itself or other modules and/or can respond when certain events or interruptions are detected. A software module may be provided on a computer-readable medium, which may be set up to perform operations on a computer device (e.g., processor 220). The computer-readable medium here can be an optical disc, digital disc, flash drive, disk, or any other kind of tangible medium. Software modules can also be obtained in digital download mode (digital downloads here also include data stored in compressed or installed packages that need to be decompressed or decoded before they can be executed). Here the code of the software module can be partially or fully stored in the storage device of the computer device where the operation is performed and applied to the operation of the computer device. Software instructions can be embedded in firmware, such as erasable programmable read-only memory (EPROM). Obviously, the hardware module may include logic units connected together, such as gates, triggers, and/or units that include programmable units, such as a programmable gate array or processor. The modules or computer devices described herein are functionally preferably implemented as software modules, but may also be represented in hardware or firmware. In general, the modules referred to here are logical modules, not limited by their specific physical form or memory. A module can be combined with other modules, or separated into a series of sub-modules.

All or parts of software may sometimes communicate over a network, such as the Internet or other communication networks. This type of communication may load software from one computer device or processor to another, for example, from a server or host computer of an IoT communication system to a hardware platform of a computer environment, or other computer environment that implements a system, or a system with similar functions related to providing information required for the IoT communication system. Therefore, another medium capable of transmitting software elements may also be used as a physical connection between local devices, such as light waves, radio waves, electromagnetic waves, etc. that implement propagation through cables, optical cables, air and the like. Physical media used for carrying waves, such as electrical cables, wireless connections, optical cables and similar devices may also be considered as media carrying software. As used herein, unless tangible "storage" media is restricted, other terms referring to computer or machine "readable media" refer to media that participates in a processor's execution of any instructions.

Unless otherwise defined, all terms (including technical and scientific terms) used herein have the same meaning as commonly understood by one of ordinary skill in the art to which this application belongs. It should also be understood that terms such as those defined in ordinary dictionaries should be interpreted as having meanings consistent with their meaning in the context of relevant technologies, and should not be interpreted in an idealized or highly formal sense, unless explicitly such defined herein.

The above is a description of the present disclosure and should not be considered as a limitation thereof. Although several exemplary embodiments of the present disclosure have been described, those skilled in the art will readily understand that many modifications may be made to the exemplary embodiments without departing from the novel teachings and advantages of the present disclosure. Accordingly, all such modifications are intended to be included within the scope of the present disclosure as defined by the claims. It should be understood that the above is a description of the present disclosure and should not be considered as being limited to the particular disclosed embodiments, and modifications to the disclosed embodiments and other embodiments are intended to be included within the scope of the appended claims. This application is defined by the claims and their equivalents.

What is claimed is:

1. A data processing method for security authentication at a tangible common service entity, comprising:
   receiving, from a tangible application entity, an identifier of the application entity;
   generating dynamically, at least based on a random identifier and the identifier of the application entity, a security identifier for the application entity;
   storing, in a database, the security identifier for the application entity in association with the identifier of the application entity,
   sending, to the application entity, the security identifier for the application entity;
   receiving, from the application entity, a security identifier for security authentication;
   comparing the security identifier for security authentication received from the application entity with the stored security identifier in association with the identifier of the application entity, and
   if a comparison result indicates that the security identifier for security authentication is consistent with the stored security identifier in association with the identifier of the application entity, the authentication passes, otherwise the authentication does not pass.

2. The data processing method according to claim 1, wherein generating the security identifier based on the identifier and the random identifier comprises:
   generating a string by combining the identifier of the application entity and the random identifier;
   transforming the string to a hash value using a hash algorithm, and taking the hash value as the security identifier for the application entity.

3. The data processing method according to claim 1, wherein the random identifier comprises a Universally Unique Identifier (UUID).

4. A computer readable storage medium with computer program instructions stored thereon, the computer program instructions implementing the data processing method according to claim 1 when being executed by a processor.

5. The data processing method according to claim 1, further comprising:

performing an update operation on the security identifier for the application entity according to a predetermined rule, to generate an updated security identifier for the application entity; and replacing the stored security identifier for the application entity in association with the identifier with the updated security identifier for the application entity.

6. The data processing method according to claim 5, wherein the predetermined rule comprises that a time from a previous update exceeds a predetermined time threshold.

7. The data processing method according to claim 5, wherein the predetermined rule comprises that the security identifier has been used for security authentication for a number of times more than a predetermined threshold value.

8. A server, comprising: a processor and a database, wherein the server is configured to perform the data processing method according to claim 1.

9. The server according to claim 8, wherein the processor is further configured to:
generate a string by combining the identifier and the random identifier;
transform the string to a hash value using a hash algorithm, and taking the hash value as the security identifier.

10. The server according to claim 8, wherein the processor is further configured to:
perform an update operation on the security identifier according to a predetermined rule.

11. The server according to claim 10, wherein the predetermined rule comprises that a time from a previous update exceeds a predetermined time threshold.

12. The server according to claim 10, wherein the predetermined rule comprises that the security identifier has been used for security authentication for a number of times more than a predetermined threshold value.

13. A data processing method for security authentication at a application entity, comprising:
sending a connection request to a tangible common service entity, the connection request comprising an identifier of an application entity;
receiving, from the common service entity, a security identifier for the application entity, which is dynamically generated for the application entity;
replacing a stored security identifier in association with the identifier of the application entity with the received security identifier from the common service entity.

14. The data processing method according to claim 13, wherein the security identifier is dynamically generated based on the identifier of the application entity and a random identifier.

15. A client server, comprising:
an output device, configured to send a connection request to a tangible common service entity, the connection request comprising an identifier of an application entity;
an input device, configured to receive from the common service entity, a security identifier for the application entity, which is dynamically generated for the application entity;
a storage device, configured to store the security identifier for the application entity and the identifier; and
a processor, configured to control the storage device to store the security identifier by replacing a stored security identifier in association with the identifier of the application entity with the received security identifier from the common service entity.

* * * * *